United States Patent [19]

Berger

[11] Patent Number: 5,025,201
[45] Date of Patent: Jun. 18, 1991

[54] SEGMENTED RESOLVER

[75] Inventor: Alexander Berger, San Diego, Calif.

[73] Assignee: Vernitron Corporation, San Diego, Calif.

[21] Appl. No.: 507,123

[22] Filed: Mar. 14, 1990

[51] Int. Cl.$^5$ .............................................. G05B 19/31
[52] U.S. Cl. ....................................... 318/605; 310/36;
     310/38; 310/39; 310/254
[58] Field of Search ................... 318/605, 119; 310/36,
     310/38, 39, 254, 261, 258–260; 336/120

[56] References Cited

U.S. PATENT DOCUMENTS

| | | | |
|---|---|---|---|
| 1,821,123 | 9/1931 | Stuart | 310/39 |
| 4,250,416 | 2/1981 | Watanabe et al. | 310/36 |
| 4,672,347 | 6/1987 | Garcia et al. | 336/132 |

Primary Examiner—William M. Shoop, Jr.
Assistant Examiner—Saul M. Bergmann
Attorney, Agent, or Firm—Edward H. Loveman

[57] ABSTRACT

This electrical resolver has an arcuate stator with a concave inner side concentric to a convex side of an angularly rotatable arcuate rotor limited to rotation within outer ends of the stator. The stator and rotor have arcuate magnetic cores with transverse slots in which are embedded windings made of insulated wire. Rotation of the rotor causes changes in voltages induced in the stator windings corresponding to the extent of angular position of the rotor. The stator windings include trimming coils which generate bucking voltages to reduce errors in determining angular position of the rotor. In an operating range of ±10° from a centered position, magnitudes of rotor position can be determined with an accuracy of 5–10 arc seconds maximum, with a considerable savings in space, weight, cost, simplified installation, and increased stability over the operating temperature range.

11 Claims, 3 Drawing Sheets

SEGMENTED RESOLVER

BACKGROUND OF THE INVENTION

1. Field of the Invention

This invention relates to the art of electrical resolvers, and more particularly concerns a segmented resolver having an arcuate stator and coaxial arcuate rotor.

2. Description of the Prior Art

Electrical resolvers are well known in the art and are often employed to transfer a physical quantity into an electrical quantity or vice versa. The physical quantity may be the angular rotation of a rotor with respect to a stator, and the electrical quantity may be a voltage whose amplitude and/or phase may change in coordination with changes in angular position of the rotor. Basically a resolver comprises a rotor and a stator, each having independent differently positioned windings. If an alternating input voltage is applied to the rotor winding an alternating output induced voltage will appear at the terminals of the stator winding. If the rotor is turned angularly by mechanical means such as a servomotor, the change in angular position of the rotor, expressed in degrees of arc, will cause a change in output voltage of the stator. Measurements of the output voltage change will provide an indication of the extent of change in angular position of the rotor. The resolver may be regarded as a signal transformer which has a variable ratio of output to input voltage.

Resolvers may be classified as one "speed" or multispeed (2 "speed", 8 "speed", etc), where the term "speed" corresponds to the number of pole pairs in a resolver winding.

Standard conventional electrical resolvers employ a stator and rotor both ring-shaped and mounted within coaxial sleeves or hubs to keep the stator and rotor in concentric position. In order to achieve good concentricity the mounting surfaces must have tight tolerances. Any irregularities on the mating surfaces create stresses within the resolver. These stresses increase over the operating temperature range of the resolver, since coefficients of thermal expansion for the hub/sleeves and their mating parts cannot be matched exactly within the resolver. Any stress in such a resolver causes a change in its operating characteristics. This can create an error in angular indication, change in null voltage, etc. Other objections are large sizes, heavy weights, insufficient accuracy, complexity and high costs.

SUMMARY OF THE INVENTION

It is a principal object of the present invention to provide a novel resolver structure which avoids the difficulties and disadvantages of prior electrical resolvers. According to the invention there is provided a resolver having an arcuate stator subtending about 100° of arc. The associated rotor without holder subtends about 55°. The total rotational working range of the rotor is about 30°, and the highest accuracy and precision is obtained within a total working range of 20°, or ±10° from center, null or 0° position with respect to the stator. In the optimum working range of the rotor, errors in indicating position of the rotor are limited to less than 10 seconds of arc at all points.

The stator and rotor are mounted in concentric holders which provide easy and convenient installation in any application. The holders are structured so that no stresses are created in the stator and rotor due to their manner of mounting. This makes the resolver more stable in operation than prior resolvers, even over large operating temperature variations.

In one embodiment of the invention, the rotor serves as the primary winding and has two magnetic poles for an 8 "speed" resolver instead of sixteen poles which are used in conventional ring-shaped rotors. The stator serves as the secondary and its windings are unique. They are nonsymmetrical with one phase having three poles and the other phase having four poles. Nonetheless the resolver has high accuracy in transferring angular rotation into an electrical output voltage. If further improvement of the accuracy is required, then the windings of the stator are made to work in combination with trimming coils inserted near opposite ends of the arcuate stator. The stator core has a cylindrical concave surface facing a convex cylindrical surface of the arcuate rotor. The stator and rotor are each mounted in a holder which prevents mechanically induced stresses from being transmitted back to the respective stator or rotor, which stress, if present, could cause a change in the operating characteristics of the resolver. Due to the novel construction of the resolver, precision results are obtained with the segmented rotor and stator. This effects a saving in space over that required by a ring-shaped resolver. Installation is simplified; increased accuracy is obtained; stability is maintained over the operating temperature range; and large reductions are realized in manufacturing costs and materials.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENTS

Figure 1:
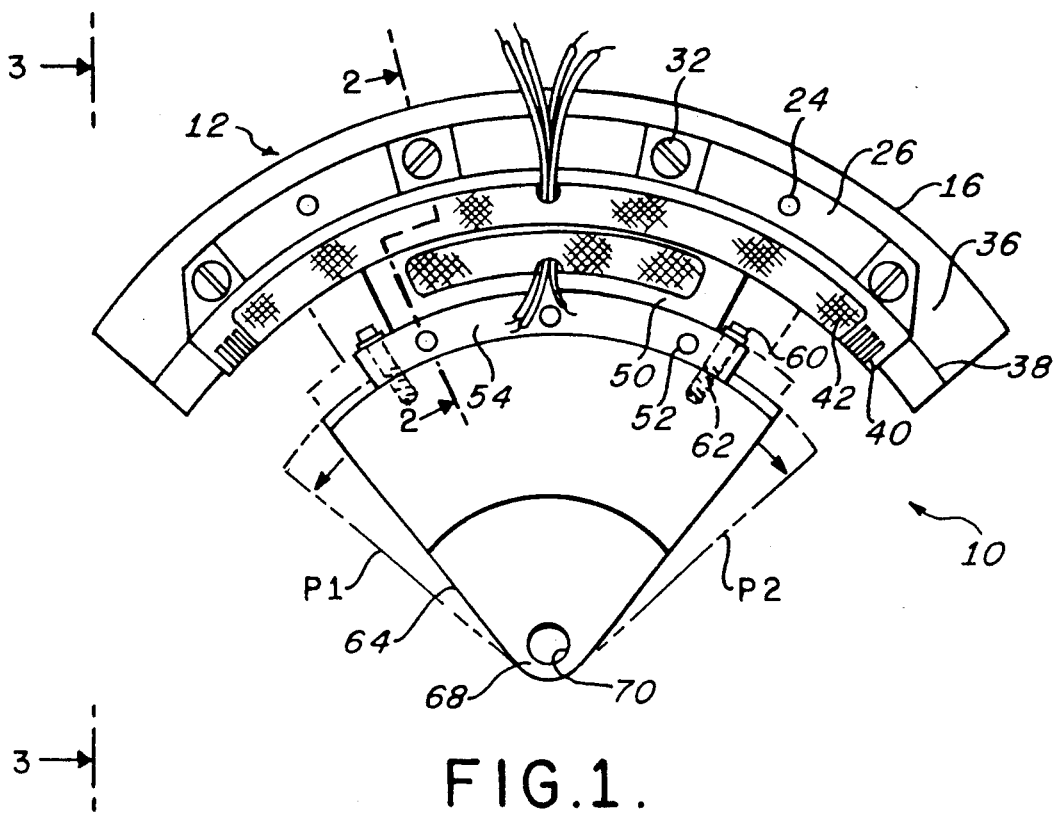
FIG. 1 is a side elevational view of a segmented resolver embodying the invention.
Figure 3:
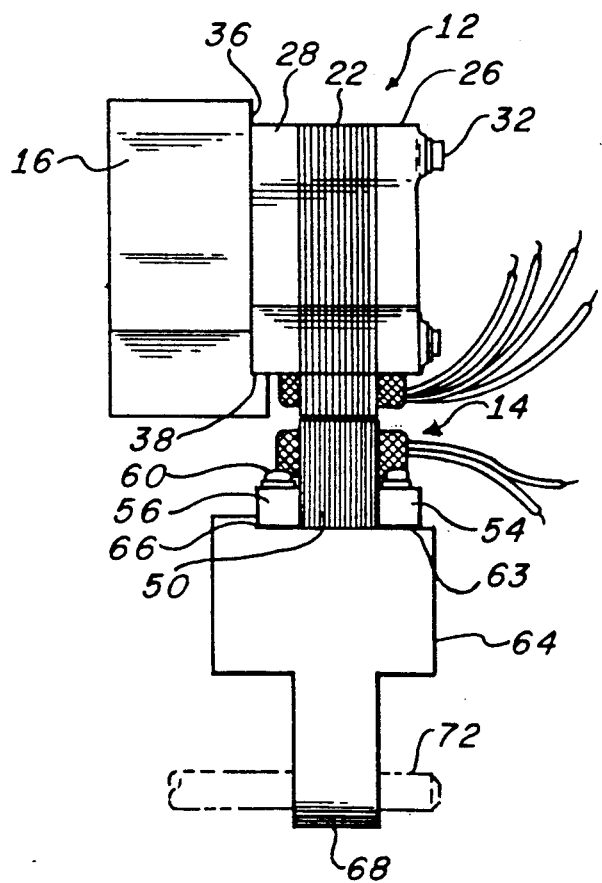
FIG. 3 is an end elevational view taken along line 3—3 of FIG. 1.
Figure 2:
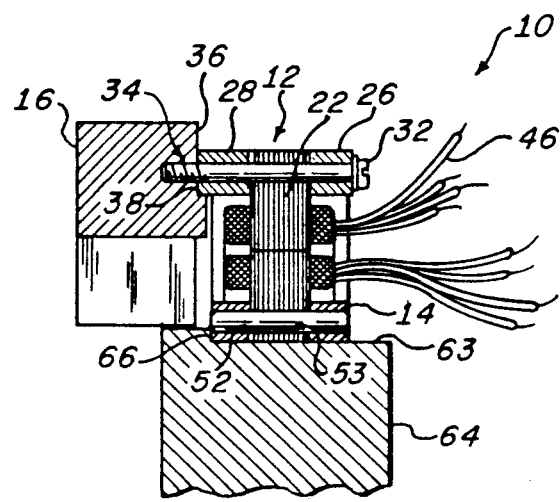
FIG. 2 is a fragmentary cross sectional view taken along line 2—2 of FIG. 1.
Figure 5:
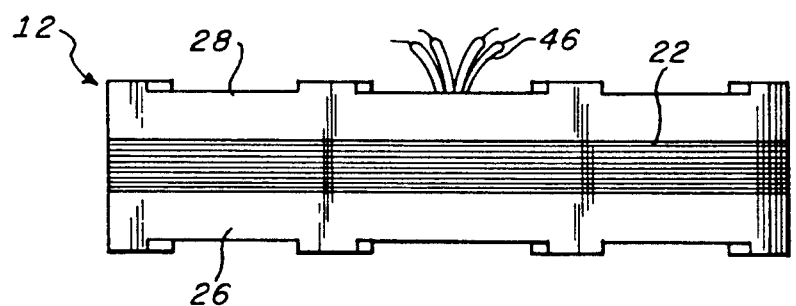
FIG. 5 is a top plan view of the stator of FIG. 4.
Figure 4:
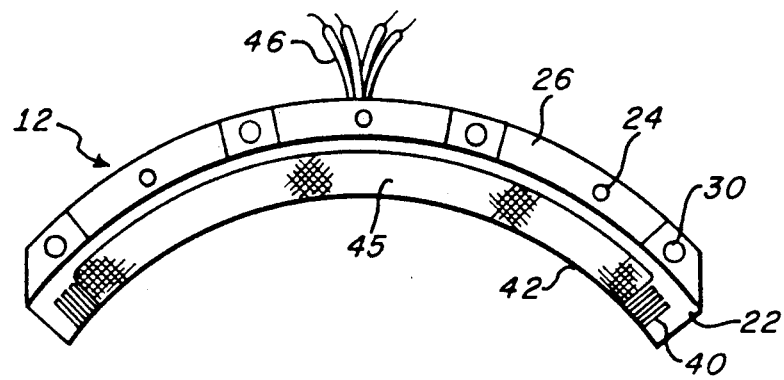
FIG. 4 is a side elevational view of a stator per se, employed in the segmented resolver.
Figure 6:
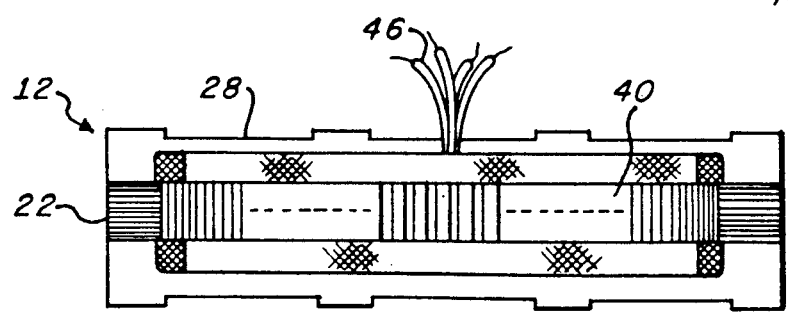
FIG. 6 is a bottom plan view of the stator of FIG. 4.
Figure 7:
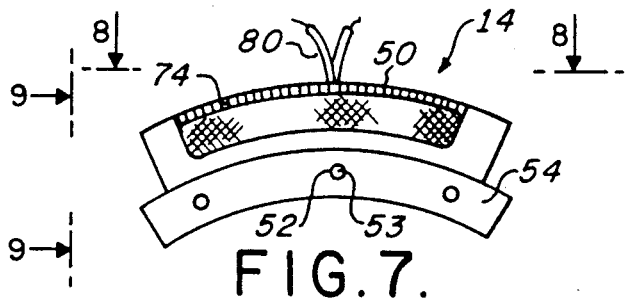
FIG. 7 is a side elevational view of a rotor per se, employed in the segmented resolver.
Figure 9:
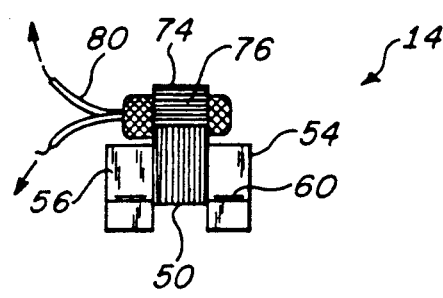
FIG. 9 is an end elevational view taken along line 9—9 FIG. 7.
Figure 8:
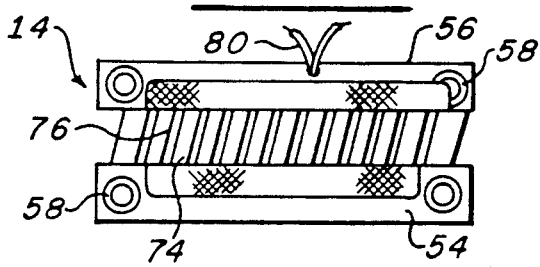
FIG. 8 is a top plan view taken along line 8—8 of FIG. 7.

Referring now to the drawings wherein like reference characters designate like or corresponding parts throughout, there is illustrated in FIGS. 1, 2 and 3, a segmented resolver designated generally by reference numeral 10, which has an arcuate stator 12 and an arcuate rotor 14 rotatable angularly with respect thereto.

The arcuate stator 12 shown in FIGS. 1-6 has an arcuate magnetizable core 22 formed of a multiplicity of thin arcuate plates laterally abutted and secured by a plurality of spaced pins 24 which extend through the core 22 and through two arcuate steel bar holders 26, 28, each abutted to an opposite side of the core 22 at its convex outer edge. After the plates of the core 22 are secured between the holder bars 26, 28 they may be cemented together in the conventional manner. A multiplicity of holes 30 extend through the bar holders 26, 28 and the core 22 and in registration thereof, for each receiving a fastening device such as a bolt 32 which is engaged in a threaded hole 34 in a front wall 36 of a stationary support 16. A convex, arcuate ledge or shoulder 38 may be provided on the wall 36 of the support 16. The bar 28 may seat on the ledge 38 so that the stator 12 is maintained in stable position on the support 16, concentric to the rotor 14. The total angular extent of the arcuate stator 12, and the holder rings 26 28 is about 100°.

Figure 10:
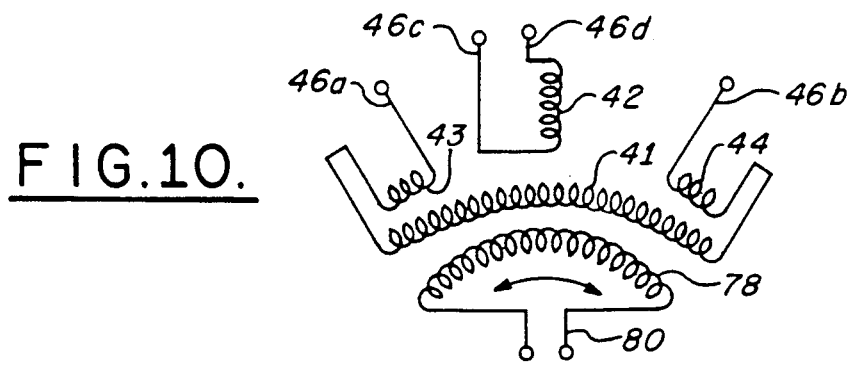
FIG. 10 is a circuit diagram of windings employed in the segmented resolver.

The core 22 has a multiplicity of transverse slots 40 extending inwardly from a cylindrically concave side 42 of the stator 12. Wire windings 41-44 indicated schematically in FIG. 10 are wound and embedded in the slots 40. The windings 41-44 terminate in lead wires 46 for connection to external circuitry. The windings 41-44 are made of turns of insulated wire. The open ends of the slots 40 are closed by a potting compound flush with the smooth surface of the concave side 42.

The rotor 14 shown in FIGS. 1-3, 7-9 has a magnetizable core 50 formed of a multiplicity of thin laterally abutted plates secured by spaced pins 52 which extend through holes 53 in the core 50 and two arcuate steel bar holders 54, 56 each abutted to an opposite side of the core 50. After the plates of the core 50 are secured between the holders 54 56, they may be cemented together in the conventional manner. The bar holders 54, 56 extend beyond the core 50 at opposite ends and have a plurality of counterbored holes 58 in which each may receive a fastener such as a bolt 60. The bolts 60 extend radially of the rotor 14 and are seated in threaded holes 62 at an upper convex side 63 of a support 64 which may be a sector plate formed with an arcuate shoulder or ledge 66 on which is seated the arcuate rear bar holder 56. The rotor 14 seats snugly and securely on the upper convex side 63 of the support 64, concentric to the axis of rotation. The core 50 extends arcuately about 60°. The holder bars 54, 56, extend arcuately about 70°. At an apical end 68 of the suppport 64 may be provided a hole 70 which can receive a shaft 72 (indicated in dotted lines in FIG. 3) of a servomotor or other mechanical rotating device.

The convex side 74 of the rotor core 50 has slots 76 slanted or skewed transversely across the core 50. In these slots 76 are embedded coils of wire forming winding 78 shown schematically in FIG. 10. The winding 78 is distributed in the slots 76 to form two poles with the winding 78 terminating in lead wires 80. The total operating angle of rotation of the rotor 14 is about 30° or ±15° on opposite sides of the null, center, or 0° position shown in FIG. 1, with respect to the stator 12. The optimum operating angle of rotation of the rotor 14 is not more than 24° and preferably about 20° or ±10° from the 0° position indicated by left and right dotted line positions P1, P2 shown in FIG. 1.

FIG. 10 shows schematically the several wire windings of the stator 12 and the rotor 14. The winding 41 is the first phase main winding of the stator 12 and has four poles and the winding 42 is the second phase winding and has three poles. Near opposite ends of the winding 41 are small windings 43,44 which are the trimming coils of the stator. An amplitude of a voltage induced in the second phase winding 42, changes as a sine function of the rotor angular rotation, and an amplitude of a voltage induced in the first phase winding 41 changes as a cosine function of the rotor angular rotation. The winding 41 is connected to the bucking or trimming windings or coils 43, 44 which in turn terminate in output leads 46a, 46b. Voltages are induced in windings 43, 44 which will add to or subtract from the voltage in the winding 41, depending on how the coils 43, 44 are connected to the winding 41. The winding 42 terminates in wire leads 46c, 46d. The leads 46a-46d will be connected to external circuitry and sensing devices calibrated to read the extent of angular rotation of the rotor 14. The leads 80 are connected to an external voltage or electric power source.

Figure 11:
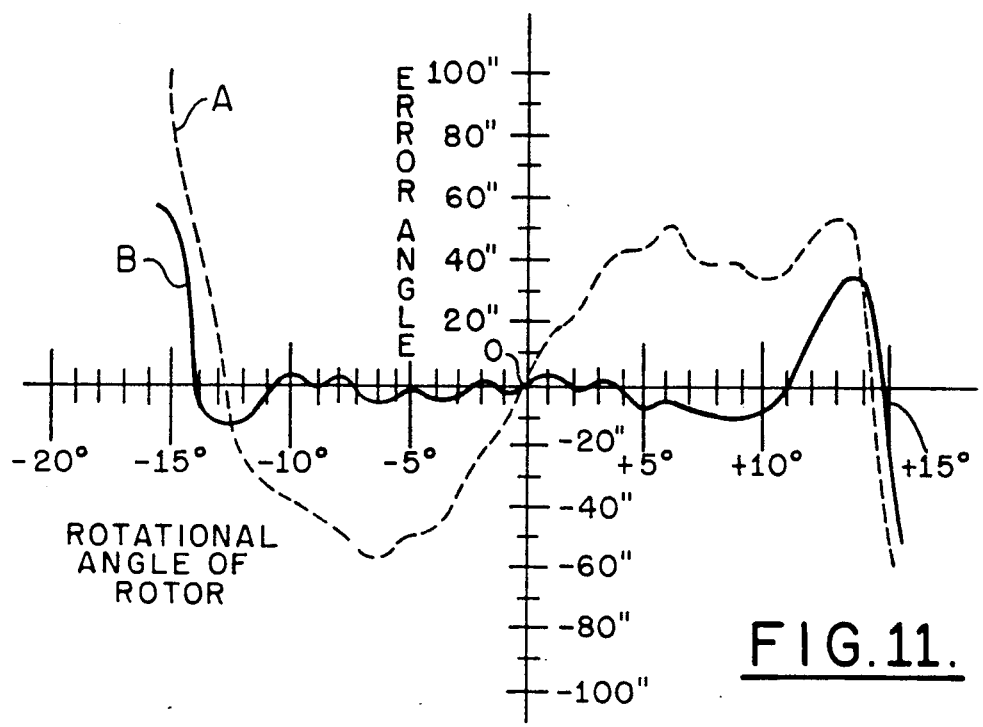
FIG. 11 is a graphical diagram used in explaining the operation of the bucking or trimming coils used in the stator of the segmented resolver.

FIG. 11 is a diagram illustrating the effect of trimming coils 43, 44. In this example dotted line curve A shows that the maximum error is ±100 seconds of arc for all of the positions of the rotor 14 up to ±15° from the center when the trimming coils 43 and 44 are not used. The error reaches a maximum of about ±60° seconds of arc at about ±6° of rotation of the rotor 14. Changing the direction and amplitude of the voltages in the trim coils 43, 44 will trim the error down. The solid line curve B shows that the maximum error of rotational position indication in the working range of ±15° has been reduced to no more than ±55° seconds of arc at the extremities of the ±15° working range when the trimming coils 43, 44 are used. When the working range is limited to ±10° the maximum error of rotational position indication is never more than ±10° seconds of arc and may be as little as zero. This zero error is shown to occur at −9°, −7.8°, −2.5°, +2°, +4°. At ±6° the error is reduced to less than 10 seconds of arc as contrasted with curve A where the error is ±60" maximum at ±6°. However, even without the trimming coils 43, 44 the maximum error is similar to that experienced with conventional ring-type resolvers, but the additional advantages of the segmented resolver such as space, weight and cost savings, simplicity of installation, stability over temperature range, etc. make the use of this type of resolver clearly preferable. When the trimming coils 43, 44 are used, the error may average about ±5" of arc, which in addition to the other advantages specified above, makes the segmented resolver more accurate than that obtainable with any prior ring-type resolver.

It should be understood that this unique design of a segmented resolver permits trimming the two legs of the error curve (on different sides from the zero point) independently. That is the right side can be trimmed with the right trim coil, and the left side with the left trim coil, thereby allowing more control and better accuracy than permitted on ring type resolvers where trimming may reduce the error in one portion, but increases the error in another portion of the curve.

The resolver 10 may be utilized for numerous applications such as scanning mechanisms, robotics, pitch and roll platforms, thermal imagers, turret position control, position calibrating equipment, fire control systems, positions controls of machine tools, aircraft, marine installations, etc.

The following are exemplary performance and structural parameters for a segmented resolver as described above. The parameters stated can be changed depending on the specifications for any particular application.

| Nominal Performance Characteristics at 25° C. | | |
| --- | --- | --- |
| Characteristic | Units | Specification |
| Primary Voltage (rotor coil) | Volts | 10 |
| Frequency | Hertz | 1000 |
| Input Power (rotor) | Milliwatts | 15 |
| Impedance, primary (rotor) | Ohms | 330 + j1400 |
| Impedance, secondary (stator) | Ohms | 300 + j330 |
| Transformation ratio | — | 0.500 |
| Phase Shift | Degrees | 12 |
| Null Voltage | Millivolts | 10 (max) |
| Transmitter error (rotor position) | Seconds | 5-10 max.  10-15 max. |
| Operating angular range | Degrees | ±5  ±10 |

The arcuate construction as contrasted with the full ring structure of prior resolvers effects large decreases in assembly time, savings in materials and overhead, and much lower cost to the user.

In the foregoing description, the rotor 14 is used as a primary and stator serves as the secondary. Mechanical power is applied to turn the rotor. The resolver serves as a transformer to transmit signals corresponding to the change in angular position of the rotor. It is possible to reverse the functions of the rotor and the stator, so that the stator serves as the primary and the rotor serves as the secondary.

The resolver can be used in diverse fields for many different applications. It can be used for example in conjunction with computers or other apparatus for solution of problems relating to addition, composition or resolution of vectors, the addition of angles, solution of various trigonometric problems, and rotation of co-ordinates and transfers between polar and rectangular coordinates, but by far, resolvers are used primarily for accurate transmission of angular position in data transmission systems and gyroscopic applications which purposes are well known in the art and have been long used, see for example the applications described in U.S. Pat. Nos. 2,671,875 and 3,051,880.

It should be understood that the foregoing relates to only a preferred embodiment of the invention which has been by way of example only, and that it is intended to cover all changes and modifications of the examples of the invention herein chosed for the purpose of the disclosure, which do not constitute departures from the spirit and scope of the invention.

What is claimed is:

1. An electrical resolver, comprising:
   an arcuate stator means, said stator means having a stator cylindrically curved magnetizable core with a predetermined circumferential length, said stator core having a concave side formed with a plurality of stator transverse slots;
   a stator insulated coiled wire embedded in said stator slots, said stator coiled wire terminating in stator leads outside said stator core for connection to an external circuit;
   an arcuate rotor means, said rotor means having a rotor cylindrically curved magnetizable core with a circumferential length shorter than that of said stator core, said rotor core having a convex side formed with a multiplicity of rotor transverse slots, a rotor insulated coiled wire embedded in said rotor slots and terminating in rotor leads outside said rotor core, said rotor coiled wire inducing a first voltage in said stator coiled wire when said rotor leads are connected to an external electric power source,
   said stator means and said rotor means being concentrically disposed with said convex side of said rotor core and said concave side of said stator core having a constant air gap therebetween; and
   means connected to said rotor means for rotating same to a plurality of angular positions within an arc of predetermined length shorter than said circumferential length of said stator core, thereby changing said first voltage induced in said stator coiled wire to an extent determined by the extent of angular rotation of said rotor means, with respect to said stator means.

2. An electrical resolver as claimed in claim 1, wherein said stator core extends circumferentially through not more than 120° of arc to minimize overall size and weight of said resolver.

3. An electrical resolver as claimed in claim 1, wherein said rotor core extends circumferentially through not more than 70% of the circumferential extent of said stator core so that said rotor core will remain within outer ends of said stator core at all times, during angular rotation of said rotor means with respect to said stator means.

4. An electric resolver as claimed in claim 1, wherein said stator coiled wire is formed as a first and a second winding so wound that a first voltage is induced in said first winding and an amplitude of said first voltage changes as a cosine function, to an extent determined by the angular rotation of said rotor means with respect to said stator means, and a second voltage is induced in said second winding and an amplitude of said second voltage changes as a sine function, to an extent determined by the angular rotation of said rotor means with respect to said stator means.

5. An electric resolver as claimed in claim 1, wherein said stator coiled wire is formed with a third winding wound so that a third voltage may be induced in said third winding when said rotor means is angularly rotated, said third voltage being added to or subtracted from said first voltage induced in said stator winding, for minimizing errors in determining the extent of angular position of said rotor means with respect to said stator means.

6. An electric resolver as claimed in claim 1, wherein said stator coiled wire is formed with a third and a fourth winding spaced apart in said stator core and wound so that third and fourth voltages induced in said third and fourth windings respectively, may be added to or subtracted from said first voltage induced in said stator winding, for minimizing errors in determining the extent of angular position of said rotor means with respect to said stator means.

7. An electrical resolver as claimed in claim 6, wherein said errors are limited to less than ten seconds of arc when rotation of said rotor means is limited to less than ±10° from a 0° position where said rotor core is centered between opposite ends of said stator core.

8. An electrical resolver as claimed in claim 1, wherein said stator means includes a stator holder connected to said stator core for mounting the same in fixed position on a support.

9. An electrical resolver as claimed in claim 8, wherein said stator holder is comprised of a first pair of arcuate bars each of the bars from said first pair of arcuate bars being secured to opposite sides of said stator core.

10. An electrical resolver as claimed in claim 1, wherein said rotor means includes a rotor holder connected to said rotor core for holding the same concentric to said stator core for all rotating positions of said rotor means.

11. An electrical resolver as claimed in claim 10 wherein said rotor holder is comprised of a second pair of arcuate bars each of the bars of said second pair of arcuate bars being secured to opposite sides of said rotor core.

* * * * *